United States Patent [19]

Wyndham et al.

[11] 3,791,790
[45] Feb. 12, 1974

[54] PORTABLE PURIFICATION DEVICE FOR FLUIDS

[75] Inventors: John L. Wyndham; Wayne E. Stevens; Philip J. McCauley, all of El Paso, Tex.

[73] Assignee: Intertech Corporation, El Paso, Tex.

[22] Filed: Nov. 16, 1971

[21] Appl. No.: 199,156

Related U.S. Application Data

[63] Continuation of Ser. No. 782,657, Dec. 10, 1968, abandoned.

[52] U.S. Cl. ............. 21/102 R, 21/DIG. 2, 21/54 R
[51] Int. Cl. .......................... C02b 3/00, A61l 3/00
[58] Field of Search ............ 21/DIG. 2, 54 R, 102 R

[56] References Cited
UNITED STATES PATENTS

| 3,498,457 | 3/1970 | Gough | 21/102 X |
| 1,969,655 | 8/1939 | Mailey | 21/DIG. 2 |
| 3,471,693 | 10/1969 | Veloz | 21/102 R X |
| 3,551,091 | 12/1970 | Veloz | 21/102 R |

FOREIGN PATENTS OR APPLICATIONS

| 674,555 | 11/1963 | Canada | 21/102 R |
| 1,101,958 | 10/1955 | France | 21/102 R |

Primary Examiner—Joseph Scovronek
Assistant Examiner—T. W. Hagan
Attorney, Agent, or Firm—Harvey B. Jacobson

[57] ABSTRACT

A portable purification device for fluids having a filter for filtering fluid and clarifying same, and a purifying apparatus having a tube, a cylinder and a spiral distributor forming a thin, annular, spiraling flow path for subjecting filtered fluid to germicidal rays to destroy harmful micro-organisms. A pump pumps a fluid through the filter. A battery and an inverter provide alternating current for a radiation lamp which is used as a source of germicidal rays. The pump, filter, battery, inverter, and purifying apparatus are arranged in a common housing to form an integral unit.

7 Claims, 6 Drawing Figures

PATENTED FEB 12 1974  3,791,790

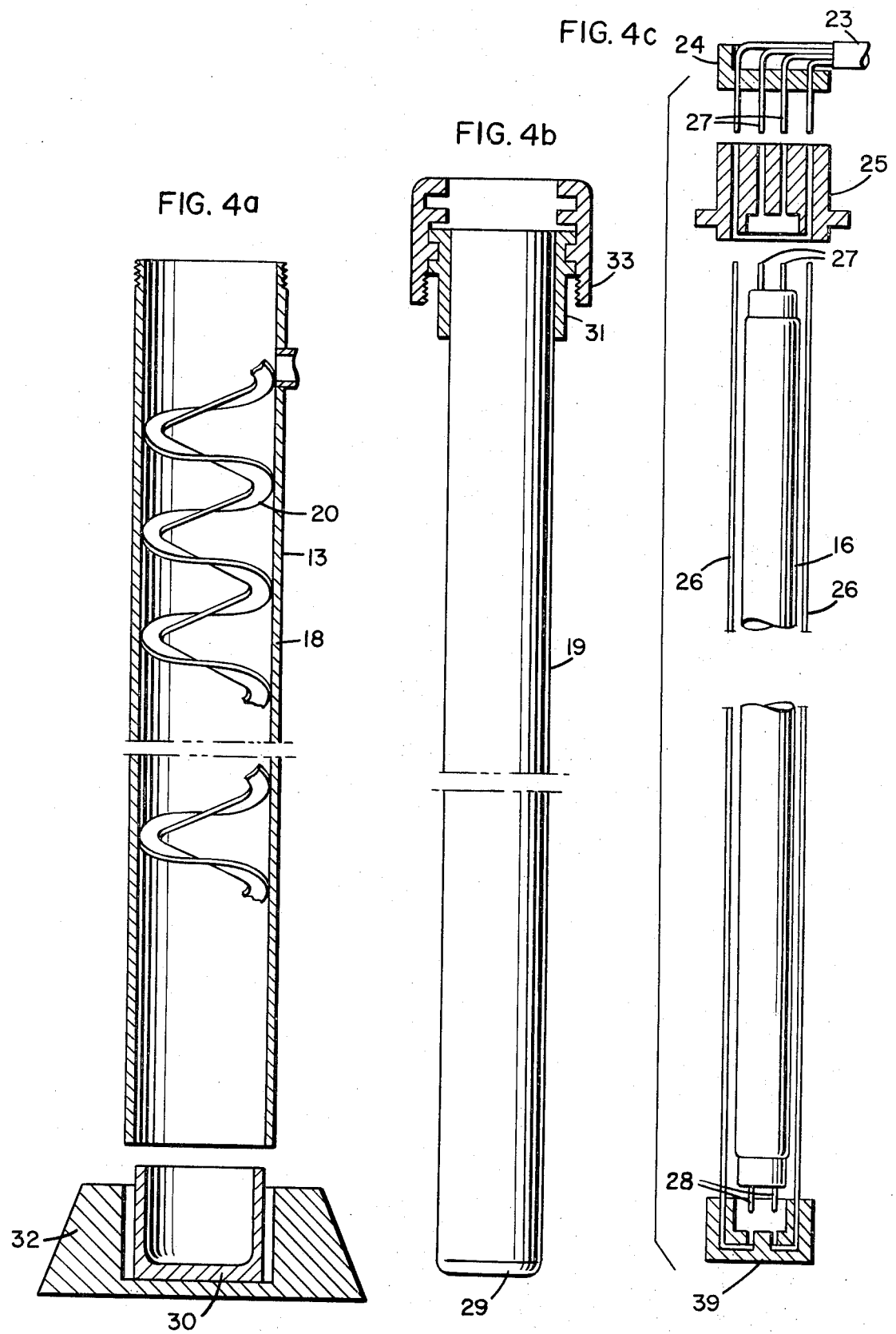

PORTABLE PURIFICATION DEVICE FOR FLUIDS

CROSS-REFERENCE TO RELATED APPLICATIONS

This application is a continuation of applicants' prior copending application, Ser. No. 782,657, filed Dec. 10, 1968, and now abandoned.

BACKGROUND OF THE INVENTION

1. Field of the Invention

This invention relates to reliable, convenient apparatus for treating fluid, and especially liquids, to remove or render harmless impurities, contaminants, bacteria, virus, or other micro-organisms, such as amoeba, for human consumption or other sensitive use where uncontaminated fluids are required. The apparatus performs a connected series of operations, and has uniquely devised and assembled components, related to each other in a novel and compact manner, to accomplish treatment by filtration and germicidal radiation of, for example, highly contaminated water. The apparatus enables a person traveling in remote areas inaccessible to conventional water purification equipment, electrical energy or portable power generating equipment, to extract a stream of clean potable water from a stagnant pool or other source of unclean water.

2. Description of the Prior Art

While a need has existed for many years for portable purification equipment for fluids, certain factors have made the service it will perform particularly important in recent years. Among these are the following:

3. Greater leisure time and transportation capabilities finds people traveling extensively beyond their accustomed environs into living areas where uncontaminated water is difficult to find. In such cases a reliable, quick means of purifying water in small quantities could prevent much sickness and loss of time, and even loss of life.

2. Population growth in many areas of the earth is increasing and concentrating faster than local chemical technology can control the resulting water pollution from human and animal waste and refuse, and from other sources.

3. Increasing dependence of human communities upon central sources of treated water and electric power can make the population helpless when these essential commodities are cut off by natural disasters such as storms, floods or earthquakes, or by industrial accidents or civil uprising, or possible enemy attack. Centrally treated water sources may become contaminated or inoperative, or only waste surface waters or flood waters may be available. Under such conditions, water-borne diseases can become epidemic.

4. War or defensive action takes soldiers and others into remote areas where water contamination is common and where standard methods of treatment may not be feasible, or transportation of treated water may be difficult and hazardous. Other small volume methods now in use have been found to have limitations in relation to amount of turbidity and contamination present in available water, and time available for application.

5. Enemy forces are known to be capable of contaminating water by bacteriological means.

The efficiency of properly deployed ultraviolet radiation for killing bacteria and virus in fluids is well documented. It is also known that the sterilizing power of these rays decreases rapidly with the distance and absorptivity of the media through which they must travel to reach their target. It is extremely important, therefore, that the treated liquid be:

a. as clear as possible and free from particulate matter which might absorb and weaken the ultraviolet rays, and b. deployed in a relatively thin film close to the source of radiation as it is passed through the treating chamber, and c. passes through the radiation chamber at a flow rate not exceeding the time-intensity capability of the radiation source.

Unfortunately, all natural water, even after filtration, contains certain dissolved mineral ions which with a change of temperature can be precipitated out to form a scale on surfaces where it makes contact. The heat incident to radiation thus causes the formation of a scale on the surface of the quartz-like transparent material which is used conventionally to separate the radiation source from the contaminated water, and which, when clean, allows transmission of a high percentage of the radiation energy. As this scale builds up, becoming opaque to the invisible germicidal wavelength of ultraviolet light, the transmission of the rays is impaired and the treatment can become ineffective. Transmission of light which is in the visible wavelengths may not be greatly reduced, but this light represents a very small fraction of the radiation energy and is not germicidally significant.

Many methods have been taught and devices have been built and operated which, when properly maintained and functioning efficiently, can effectively destroy water-borne micro-organisms by the use of ultraviolet radiation. These devices are generally intended for permanent central installation, or require a separate and independent source of energy, and require the use of chemicals or fixed electrical installations or power generating equipment. Further, these known devices create a human tendency not to perform critically important cleaning and maintenance, or to defer such cleaning and maintenance until trained service personnel are available. Without this cleaning and maintenance, any radiation type purification unit can become nonfunctional and unsafe for processing water to potability. For the reasons discussed above, inspection for wall clarity is essential to function evaluation and reliability, since it is difficult or impossible without the use of special instrumentation or laboratory equipment to detect whether the rays are actually penetrating the fluid being treated with sufficient intensity to decontaminate the fluid.

SUMMARY OF THE INVENTION

It is an object of the present invention to provide fluid purification apparatus utilizing germicidal radiation which would enable a person to readily, conveniently and reliably convert, for example, polluted or contaminated water, which he might find in the field, into potable water for immediate use.

Another important object of the present invention is to provide apparatus for purifying contaminated fluids, using a hand portable combination of simple, light weight components which can be conveniently carried by an individual in remote areas.

Another object is to provide apparatus for purifying fluids using small hand and battery operated devices which can be easily and safely inspected, maintained and cleaned by unskilled users, without tools or special training.

Still another object is to present an apparatus for forcing contaminated water or other impure or dirty liquids through a combination of small, lightweight devices in such a way as to remove harmful impurities and destroy bacterial and virus.

An over-riding object is to enable a user of the present invention to be temporarily, but totally, independent of any public water supply, requiring only such surface or subterranean water which might be potable, except for turbidity and bacterial contamination, as he might find to decontaminate for potability.

The apparatus according to the present invention employs a combination of equipment to cause the contaminated liquid to flow through a strainer-filter combination of particular design so as to clarify the liquid and to remove any suspended impurities, turbidity and larger contaminants which may include some larger micro-organisms. The filtration unit employed may also include a section in which the liquid comes in contact with certain taste improving and de-odorizing materials so that the liquid flowing from the filter unit is not unpleasant in taste or smell. The clarified and precleaned liquid is then caused to flow through a sterilizing chamber which is specifically designed to bring the liquid into intimate contact with ultraviolet radiation or other germicidal rays for a sufficient period of time to assure complete destruction of harmful micro-organisms passed through the filter.

An advantageous feature of the present invention permits the purifying components to be disassembled for all necessary inspection, cleaning, and replacement of functioning parts in a rapid and easy manner by any unskilled user. Accordingly, the complex, time consuming disassembly for inspection, cleaning, and maintenance inherent to known devices is eliminated.

The combination of elements used in the present invention has novel and unique features which make it possible to obtain the desired purification and sterilization of liquid immediately at any point on earth, or other planet, where a small, lightweight, battery-operated device can be taken. This has never before been possible.

BRIEF DESCRIPTION OF THE DRAWINGS

FIGS. 4a, 4b and 4c are exploded vertical longitudinal sectional views showing the components of a purifier unit according to the present invention.

DESCRIPTION OF THE PREFERRED EMBODIMENTS

Figure 3:
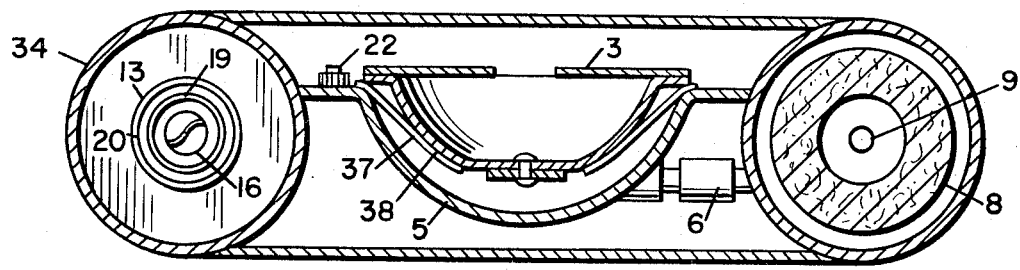
FIG. 3 is a vertical longitudinal sectional view of the apparatus of FIG. 2.
Figure 1:
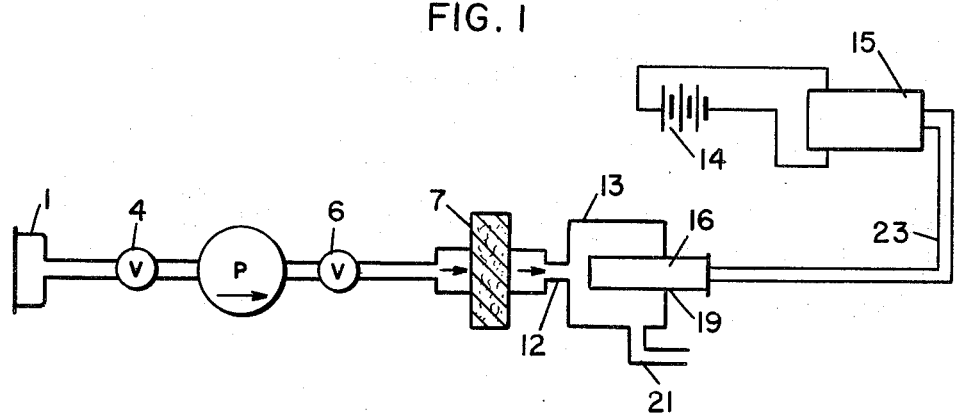
FIG. 1 is a schematic flow diagram showing a fluid purification apparatus according to the present invention, and having a strainer, hand-operated pump, filter, battery, inverter, and purifier.
Figure 2:
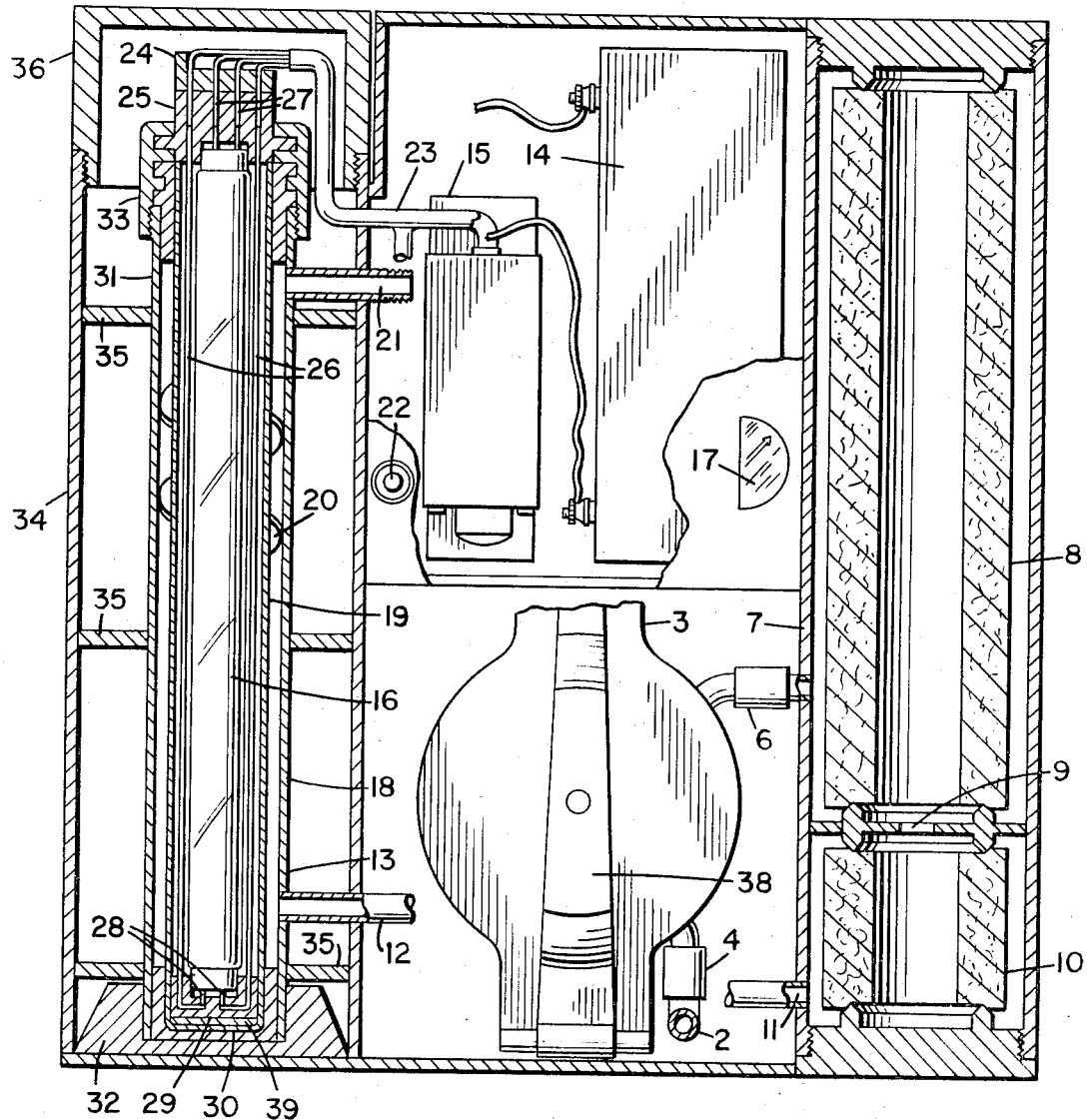
FIG. 2 is a vertical longitudinal sectional view of a typical set of devices, so constructed and assembled as to form a lightweight portable, self-energized unit according to the present invention.

FIGS. 1, 2 and 3 show a hand-operated diaphragm pump, the body of which is molded, machined, and forms a part of the purifier housing. The diaphragm 37, pump bowl 38, and handles 3 are fastened to the pump housing as shown. The pumping unit contains a flexible hose 2 and strainer 1, as shown in FIG. 1, which can be placed in a pond, stream or other source of fluid to be treated. Up and down motion of the pump handle 3 causes the fluid to be drawn through the strainer 1, the flexible hose 2, the inlet check valve 4, and into the pump basin 5. The water is then forced through the outlet check valve 6 and into the filter housing 7.

The fluid being treated flows through a removable filter element 8 for the removal of contaminants. After passing through the walls of filter element 8 the fluid flows through the center of the element 8, through a divider port 9 and into the center of an odor removal element 10. The fluid is contacted by odor absorbing material as it flows through the walls of element 10, and the clarified and deodorized fluid then flows through filter housing 7, outlet port 11 which interconnects with the purifier inlet nozzle 12 of a purifying unit, and into a purifier cylinder 13 where the contaminated fluid is subjected to intense ultraviolet radiation. The source of energy in the present illustration is a re-chargeable dry battery 14. In the present apparatus, a 6 cell, 7.2 volt nickle-cadmium battery which weighs 2 pounds is used, but other high performance lightweight rechargeable batteries in other voltages could be used. Direct current from the battery flows to inverter 15 which converts the low-voltage direct current energy to the higher voltage alternating current required to operate an UV-radiation lamp 16. The above combination of devices provides approximately 2 hours of continuous or intermittent operation without recharging, or (at average hand pumping rates) 45 gallons of potable water at 1.5 qts. per minute. A voltmeter 17 is used to indicate when battery 14 is approaching recharging range for this application. Battery 14 may be recharged from a motor vehicle or aircraft battery, or from conventional house current.

The germicidal lamp 16 has a manufacturer's estimated life of 2,000 hours in this application. A viewport (not shown) in the purifier cylinder wall reveals a glow when the lamp is receiving power. Proper battery power, in conjunction with a clean transparent cylinder, provides reliability equivalent or superior to that of a public water supply system.

The heart of the apparatus employed in this invention is a purifier chamber 13, which is an annular space in the illustrated embodiment, where the water being treated is forced through the thin laminar annulus surrounding UV lamp 16.

The inside surface of the wall of purifier chamber 13 is made of material designed to accomplish maximum reflection of rays striking the wall after transmission through the fluid being treated.

The operation of the purifier unit can be better understood by examining the following functional description with reference to FIGS. 2 and 3.

Untreated fluid enters the purifier housing 13 through the inlet nozzle 12 where it travels through a spiraling path formed by the annular space between the cylinder wall of chamber 13 and a concentric transparent cylinder 18 as guided by a spiral distributor 20. This motion assures that all portions of the fluid receive intimate and timely penetration by the ultraviolet radiation which passes through a transparent tube 19 from the ultraviolet lamp 16. After numerous spirals in turbulent motion around tube 19, the sterilized fluid leaves the chamber via outlet tube 21.

Electricity to power the UV lamp originates in the low voltage, rechargeable dry battery 14 shown in FIG. 2. When activated by switch 22, current passes through inverter 15 where the direct current characteristics are changed to sufficiently high voltage alternating current to cause generation of UV radiation in lamp 16. The current to lamp 16 is conveyed through electrical conduit 23 containing 4 wires ending in terminal jack 24, which quick-couples with the two conductor rods 26 and the two upper terminal contacts 27 of lamp 16. The lower terminal contacts 28 of lamp 16 are connected to the conductor rods 26 at the lower receptical plug 39. The upper and lower receptical plugs 25 and 39, respectively, also serve as cushioning supports to position the UV lamp within the transparent tube 19. End thrust cushioning is also provided by rubber spacer 29. Transparent tube 19 is supported and cushioned inside and at the bottom of cylinder 13 by means of a rubber-like receiver 30, and at the top by means of a rubber-like grommet 31. Cushioning is also provided by spiral 20. Cylinder 13 is sealed at the bottom by means of rubber-like receiver 30 and lower cushioning rubber-like cap 32 to prevent any leakage of water. It is sealed at the top by rubber-like grommet 31 and upper cap 33. Cylinder 13 is supported and cushioned inside external cylinder housing 34 by means of soft rubber-like rings 35, giving the entire unit protection against shock and rough handling. Foam-like cushioning is an alternative to the rubber ring.

Heat generated by the lamp is removed by the treated fluid, but changes in the fluid can cause a deposition of a mineral scale on the outer wall of transparent tube 19. This scale formation, together with any film from turbidity which might escape filter element 8, cause a reduction of transmission of the germicidal radiation through the tube wall. Such scale or film can be promptly and conveniently controlled in the present invention, because transparent tube 19 can be quickly withdrawn, cleaned and returned to its functional position. The purifying components can be disassembled for cleaning or replacement of parts by any unskilled user.

The disassembled components are shown in FIG. 4. The housing cap 26 is removed by unscrewing, and electrical jack 24 is quickly disconnected. Transparent tube 19 is then removed by simply unscrewing upper cap 33 and withdrawing the attached tube 19. Tube 19 can be inspected and cleaned as required, using a clean cloth or other device. This operation can be completed in less than a minute before or after each use of the apparatus. When necessary, lamp 16 can be removed instantly for replacement after a slight turning motion of plug 25, independent of upper cap 33 and transparent tube 19.

While the inside of transparent tube 19 is not in contact with the fluid being treated, and it is therefore unlikely that it will ever become dirty, it can nevertheless be cleaned by inserting a soft cylindrical brush or swab. The inside of transparent tube 19 is made accessible by removing the UV lamp 16 as indicated above.

In combination, the above described unique features of a radiation water treatment system provide, in a low profile, light-weight, compact and portable assembly:

1. A reliable means of making the user temporarily independent of any public water supply, even when chemicals or electrical energy from a fixed installation are not available.

2. A treatment system sufficiently compact and light-weight to permit easy hand-carrying, under-arm or back packing across rough terrain.

3. A system, with internal shock-proofing components, which allows accidental rough handling or parachute drop without damage to internal functional elements.

4. A system wherein functional efficiency can be assured with simple, quick cleaning and maintenance by unskilled users.

The above descriptions are presented as an illustration of the invention and are not intended as limiting features. It is obvious that numerous modifications in form, arrangement and size of the components can be made within the spirit and intent of the invention, by those skilled in the art.

What is claimed as new is as follows:

1. A portable purification device for fluids, comprising, in combination:

a. means for filtering a fluid and clarifying same; and b. purifying means for forming a thin, annular, spiraling flow path for subjecting filtered fluid to germicidal rays to destroy harmful microorganisms, the purifying means including a cylinder and a tube open at one end, said tube arranged concentrically in said cylinder for forming the annular flow path, an elongated radiation lamp having a pair of spaced ends provided with electrical contacts and arranged in said tube for providing the germicidal rays, said tube and cylinder being sealed against fluid leakage at a one common end and having a resilient seal seated between same at a periphery at the other open end, a pair of plugs, one plug arranged on the lamp adjacent the resilient seal and the other adjacent the common end, rigid conductor rods arranged embedded in the other plug extending along the tube and into the one plug, the conductor rods supported by the other plug, an electrical connector provided in the other plug and arranged for mating with and an associated lamp electrical contact and releasably connecting the lamp to the conductor rods and permitting the lamp to be removed from the tube while said tube and other plug remain in the cylinder, a cap arranged engaging the cylinder and retaining the one plug, the plugs being resilient and biased against the ends of the lamp by the cap for cushioning and limiting vertical movement of the lamp, and an electrical jack arranged for engaging said one plug and conductor rods while being selectively retained by said cap, whereby said tube, lamp, and jack may be disassembled by hand from said cylinder by removing said cap for inspection, cleaning, and lamp replacement and then reassembled without a need for tools and special skills.

2. A structure as defined in claim 1, wherein the device further comprises means for pumping a fluid through said means for filtering.

3. A structure as defined in claim 2, wherein said purifying means further includes inverter means connected to said battery and said radiation lamp for converting low-voltage direct current from the battery to higher voltage alternating current for said radiation lamp.

4. A structure as defined in claim 3, wherein said means for pumping, said means for filtering, and said purifying means form parts of the housing to form a light-weight portable self-energized unit.

5. A structure as defined in claim 1, wherein said purifying means further includes a battery, an inverter means connected to said battery and said radiation lamp for converting low-voltage direct current from the battery to higher voltage alternating current for said radiation lamp.

6. A structure as defined in claim 2, wherein said means for pumping, means for filtering, and said purifying means are arranged in a common housing to form a light-weight portable self-energized unit.

7. A structure as defined in claim 1, wherein said resilient seal is arranged to cushion said tube and is a fluid-tight resilient grommet, and said tube is sealed and cushioned at the one end by a fluid-tight resilient element, and further including means for resiliently mounting said cylinder.

* * * * *